US012705930B2

(12) United States Patent
Kim et al.

(10) Patent No.: US 12,705,930 B2
(45) Date of Patent: Aug. 11, 2026

(54) USER INTERFACE DEVICE, VEHICLE HAVING THE USER INTERFACE DEVICE AND METHOD FOR CONTROLLING THE VEHICLE

(71) Applicants: HYUNDAI MOTOR COMPANY, Seoul (KR); KIA CORPORATION, Seoul (KR)

(72) Inventors: Saeah Kim, Hwaseong-si (KR); Sun Mi Oh, Bucheon-si (KR); Kang Sun Lee, Seongnam-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 382 days.

(21) Appl. No.: 18/116,996

(22) Filed: Mar. 3, 2023

(65) Prior Publication Data

US 2024/0013576 A1 Jan. 11, 2024

(30) Foreign Application Priority Data

Jul. 8, 2022 (KR) ........................ 10-2022-0084207

(51) Int. Cl.
*G06V 40/20* (2022.01)
*B60K 35/10* (2024.01)
(Continued)

(52) U.S. Cl.
CPC .............. *G06V 40/28* (2022.01); *B60K 35/10* (2024.01); *G06F 3/017* (2013.01); *G06V 10/255* (2022.01);
(Continued)

(58) Field of Classification Search
CPC ...... G06V 40/28; G06V 20/597; G06V 10/26; G06V 10/255; B60K 35/00; B60K 2360/146; B60K 35/10; G06F 3/017
See application file for complete search history.

(56) References Cited

U.S. PATENT DOCUMENTS 6,256,400 B1 * 7/2001 Takata .................. G06V 40/20 382/103
6,819,782 B1 * 11/2004 Imagawa ................. G06T 7/74 382/218

(Continued)

FOREIGN PATENT DOCUMENTS

KR 10-1490908 B1 2/2015
KR 10-2022-0062165 A 5/2022

OTHER PUBLICATIONS

Korean Office Action dated Jul. 6, 2026, issued for the corresponding Korean patent application KR 10-2022-0084207 Noted: KR 10-2022-006265 A previously cited therein already of record.

*Primary Examiner* — Syed Haider

(74) *Attorney, Agent, or Firm* — Morgan, Lewis & Bockius LLP

(57) ABSTRACT

A user interface device which receives a user instruction for controlling at least one electronic device, includes a camera configured to obtain an image of a user; and at least one processor configured to divide the obtained image into a plurality of regions, determine an area occupied by the user's hand in each of the divided regions, and recognize gesture of the user based on the area occupied by the user's hand, wherein the at least one processor may be further configured to determine a direction in which the user's wrist faces based on the obtained image, and divide the obtained image into the plurality of regions based on the direction of the user's wrist.

20 Claims, 13 Drawing Sheets

(51) Int. Cl.

| | |
|---|---|
| ***G06F 3/01*** | (2006.01) |
| ***G06V 10/20*** | (2022.01) |
| ***G06V 10/26*** | (2022.01) |
| ***G06V 20/59*** | (2022.01) |

(52) U.S. Cl.
CPC ............ *G06V 10/26* (2022.01); *G06V 20/597* (2022.01); *B60K 2360/146* (2024.01)

(56) References Cited

U.S. PATENT DOCUMENTS

| | | | | |
|---|---|---|---|---|
| 2013/0336524 | A1* | 12/2013 | Zhang | G06V 10/764 382/103 |
| 2014/0168068 | A1* | 6/2014 | Kim | G06F 3/017 345/156 |
| 2015/0177846 | A1* | 6/2015 | Yin | G06V 10/7557 382/103 |
| 2016/0132124 | A1* | 5/2016 | Nakamura | G06T 7/60 345/156 |
| 2019/0034714 | A1* | 1/2019 | Barth | G06F 3/017 |
| 2020/0410264 | A1* | 12/2020 | Ahn | H04N 21/2387 |
| 2021/0191611 | A1* | 6/2021 | Wang | G06F 3/017 |
| 2023/0315209 | A1* | 10/2023 | Rao | G06V 40/28 382/103 |

* cited by examiner

①

②

③

②

③

USER INTERFACE DEVICE, VEHICLE HAVING THE USER INTERFACE DEVICE AND METHOD FOR CONTROLLING THE VEHICLE

CROSS-REFERENCE TO RELATED APPLICATION(S)

The present application claims priority to Korean Patent Application No. 10-2022-0084207, filed on Jul. 8, 2022, the entire contents of which is incorporated herein for all purposes by this reference.

BACKGROUND OF THE PRESENT DISCLOSURE

Field of the Present Disclosure

The present disclosure relates to a user interface device for receiving user instructions of various devices, a vehicle including the user interface device, and a method for controlling the vehicle.

Description of Related Art

In addition to basic driving functions, vehicle includes additional function for user convenience such as audio function, video function, navigation function, air conditioning control, seat control, and lighting control.

Such a vehicle further includes a user interface device for inputting operation instructions of various functions and outputting operation states of various functions, and the user interface device enables interaction between various devices provided in the vehicle and a user.

Recently, a technology for recognizing a user's gesture by obtaining an image of the user and transmitting a control instruction according to the user's gesture has been developed.

Conventionally, the number of the user's fingers was recognized by obtaining an image of the user's hand, and gestures were recognized based on this. However, the recognition of such gestures is not intuitive from the driver's steering control point of view, and there were problems such as errors in recognition due to overlapping fingers or inconvenience of finger gestures.

Furthermore, as gesture recognition is always activated, gesture recognition is performed on an unintended user's motion, resulting in an increase in computational resources according to unnecessary gesture recognition.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a user interface device which can improve the recognition rate of a gesture by varying a reference area for determining an area occupied by a user's hand in an image according to the angle of the user's hand in obtaining an image of the user and recognizing the gesture, and can reduce the resource of the determining system and decrease misrecognition by additionally adding a gesture for activating a gesture recognition, a vehicle including the user interface device, and a method of controlling the vehicle, According to an exemplary embodiment of the present disclosure, a user interface device which receives a user instruction for controlling at least one electronic device, may include a camera configured to obtain an image of a user; and at least one processor configured to divide the obtained image into a plurality of regions, determine an area occupied by the user's hand in each of the divided regions, and recognize gesture of the user based on the area occupied by the user's hand, wherein the at least one processor may be further configured to determine a direction in which the user's wrist faces based on the obtained image, and divide the obtained image into the plurality of regions based on the direction of the user's wrist.

The at least one processor may be further configured to divide the obtained image into quadrants based on the direction of the user's wrist to determine the area occupied by the user's hand in each of the quadrants.

The at least one processor may be further configured to determine a change amount in the area of the user's hand based on the obtained image, and switch a state of gesture recognition from an inactive state into an active state based on the determined change amount.

The at least one processor may be further configured to switch the state of the gesture recognition into the active state when the change amount in the area of the user's hand determined based on the obtained image is greater than or equal to a first set value.

The at least one processor may be further configured to switch the state of the gesture recognition from the active state into the inactive state upon concluding that there is no movement of the user recognized through the camera for more than a first time period.

The at least one processor may be further configured to reset the change amount in the area of the user's hand required for activating the gesture recognition when the change amount in the area of the user's hand determined based on the obtained image is less than the first set value, and the change amount in the area of the user's hand less than the first set value is recognized again within a second time period.

The at least one processor may be further configured to maintain the gesture recognition in the inactive state when the change amount in the area of the user's hand determined based on the obtained image is greater than or equal to a second set value which is greater than the first set value.

The user interface device may further include a database configured to store information related to the user, wherein the at least one processor may be further configured determine a shape and movement pattern of the user's hand based on the obtained image and compare the determined shape and movement pattern of the user's hand with the information stored in the database, and recognize the gesture based on the information stored in the database when the determined shape and movement pattern of the user's hand matches the information stored in the database.

According to an exemplary embodiment of the present disclosure, a vehicle may include a camera configured to obtain an image of a user; and at least one processor configured to divide the obtained image into a plurality of regions, determine an area occupied by the user's hand in each of the divided regions, and recognize gesture of the user based on the area occupied by the user's hand, wherein the at least one processor may be further configured to determine a direction in which the user's wrist faces based on the obtained image, and divide the obtained image into the plurality of regions based on the direction of the user's wrist.

The at least one processor may be further configured to divide the obtained image into quadrants based on the direction of the user's wrist to determine the area occupied by the user's hand in each of the quadrants.

The at least one processor may be further configured to determine a change amount in the area of the user's hand based on the obtained image, and switch a state of gesture recognition from an inactive state into an active state based on the determined change amount.

The at least one processor may be further configured to switch a state of gesture recognition into the active state when the change amount in the area of the user's hand determined based on the obtained image is greater than or equal to a first set value.

The at least one processor may be further configured to switch the state of the gesture recognition from the active state into the inactive state upon concluding that there is no movement of the user recognized through the camera for more than a first time period.

The at least one processor may be further configured to reset the change amount in the area of the user's hand required for activating the gesture recognition when the change amount in the area of the user's hand determined based on the obtained image is less than the first set value, and the change amount in the area of the user's hand less than the first set value is recognized again within a second time period.

The at least one processor may be further configured to maintain the gesture recognition in the inactive state when the change amount in the area of the user's hand determined based on the obtained image is greater than or equal to a second set value which is greater than the first set value.

The vehicle may further include a database configured to store information related to the user, wherein the at least one processor may be further configured to determine a shape and movement pattern of the user's hand based on the obtained image and compare the determined shape and movement pattern of the user's hand with the information stored in the database, and recognize the gesture based on the information stored in the database when the determined shape and movement pattern of the user's hand matches the information stored in the database.

According to an exemplary embodiment of the present disclosure, a method of controlling a vehicle may include obtaining an image of a user through a camera; determining a direction in which the user's wrist faces based on the obtained image; dividing the obtained image into a plurality of regions based on the direction of the user's wrist; determining an area occupied by the user's hand in each of the divided regions; and recognizing gesture of the user based on the area occupied by the user's hand.

The method may further include determining a change amount in the area of the user's hand based on the obtained image; and switching a state of gesture recognition from an inactive state into an active state based on the determined change amount in the area of the user's hand.

The method may further include switching the state of the gesture recognition from the active state into the inactive state upon concluding that there is no movement of the user recognized through the camera for more than a first time period.

The recognizing the gesture may include determine a shape and movement pattern of the user's hand based on the obtained image; comparing the determined shape and movement pattern of the user's hand with user information stored in a database; and recognizing the gesture based on the information stored in the database when the determined shape and movement pattern of the user's hand matches the information stored in the database.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
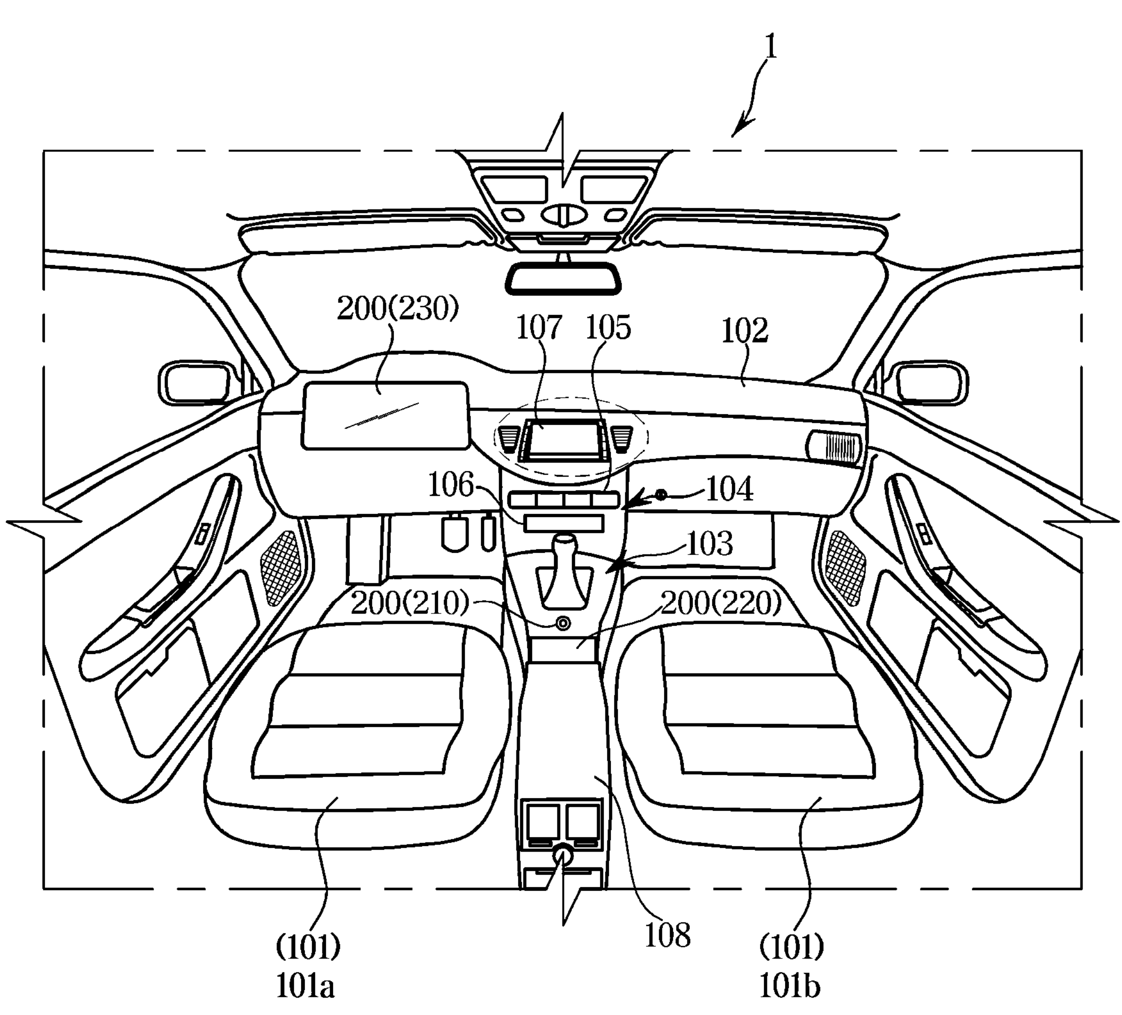
FIG. 1 is an exemplary internal diagram of a vehicle including a user interface device according to an exemplary embodiment of the present disclosure, which illustrates an exemplary internal diagram viewed from a rear seat of a vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like reference numerals refer to like components throughout the specification. The present specification does not describe all components of the embodiments, and general content in the technical field to which the present disclosure pertains or content overlapping between the exemplary embodiments is omitted. The term 'unit, module, member, block' used in the specification may be implemented in software or hardware, and according to various exemplary embodiments of the present disclosure, a plurality of 'units, modules, members, blocks' may be implemented as a single component, or one 'unit, module, member, block' may include a plurality of components.

The configuration shown in the exemplary embodiments and drawings described in the present specification is an exemplary example of the present disclosure, and there may be various modifications that can replace the exemplary embodiments and drawings of the present specification at the time of filing of the present application.

Furthermore, the terms used herein are used to describe the embodiments, and are not intended to limit and/or restrict the present disclosure. The singular expression includes the plural expression unless the context clearly dictates otherwise. In the present specification, terms such as "comprises", "provides" or "have" are intended to designate that features, numbers, steps, operations, components, parts, or combinations thereof described in the specification exist, and do not preclude in advance the possibility of the presence or addition of one or other features, numbers, steps, operations, components, parts, or combinations thereof.

Furthermore, terms such as "-unit", "-group", "-block", "-member", and "-module" may mean a unit of processing at least one function or operation. For example, the terms may mean at least one hardware such as a field-programmable gate array (FPGA)/application specific integrated circuit (ASIC), at least one software stored in a memory, or at least one process processed by a processor.

Furthermore, ordinal numbers such as "first-" and "second-" used before the components described in the present specification are only used to distinguish the components from each other, and do not have any meaning such as the order of connection, the order of use, priority, etc. between these components.

The signs attached to each step are used to identify each step, and these signs do not indicate the order between the steps, and each step may be performed differently from the stated order unless the context clearly indicates a specific order.

Meanwhile, the disclosed exemplary embodiments of the present disclosure may be implemented in a form of a recording medium storing instructions executable by a computer. Instructions may be stored in a form of program code, and upon executed by a processor, may generate program modules to perform operations of the disclosed exemplary embodiments of the present disclosure. The recording medium may be implemented as a computer-readable recording medium.

The computer-readable recording medium includes any type of recording medium in which instructions readable by the computer are stored. For example, there may be a read only memory (ROM), a random access memory (RAM), a magnetic tape, a magnetic disk, a flash memory, an optical data storage device, and the like.

Hereinafter, embodiments of a user interface device, a vehicle including the same, and a control method thereof according to one aspect will be described in detail with reference to the accompanying drawings.

Figure 2:
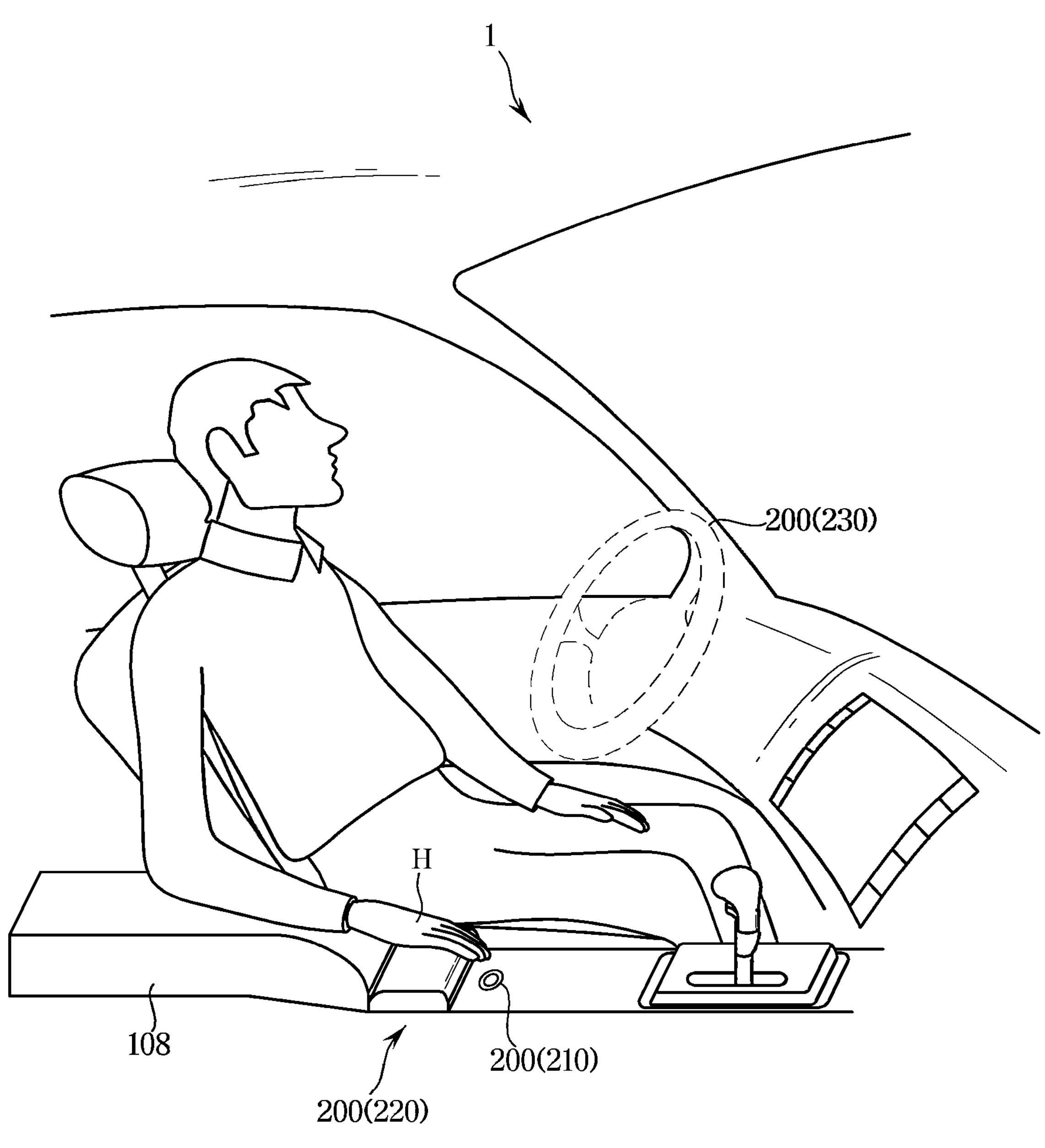
FIG. 2 is an exemplary internal diagram of a vehicle including a user interface device according to an exemplary embodiment of the present disclosure, which illustrates an exemplary internal diagram viewed from a passenger seat of a vehicle.

FIG. 1 is an exemplary internal diagram of a vehicle including a user interface device according to an exemplary embodiment of the present disclosure, which illustrates an exemplary internal diagram viewed from a rear seat of a vehicle, and FIG. 2 is an exemplary internal diagram of a vehicle including a user interface device according to an exemplary embodiment of the present disclosure, which illustrates an exemplary internal diagram viewed from a passenger seat of a vehicle.

A vehicle 1 includes a body including an internal portion and an external portion, and a chassis which is the remaining portion except for the body and in which mechanical devices necessary for driving are provided.

As illustrated in FIG. 1, the internal portion of the body includes a seat 101 on which a passenger sits, a dashboard 102, a cluster such as a speedometer, a fuel gauge, an automatic transmission selection lever indicating lamp, a tachometer, a mileage indicator, which is disposed on the dashboard to output information related to driving, a center fascia 103 including an adjustment plate for audio and air conditioner, and the like.

Here, the seat 101 includes a driver seat 101*a* on which a driver sits, a passenger seat 101*b* on which a passenger sits, and a rear seat positioned at the rear of the vehicle.

The center fascia 103 is located between the driver seat 101*a* and the passenger seat 101*b* from among the dashboard 102, and is provided with a head portion 104. A manipulator for adjusting an audio device, an air conditioner, and a heater, an air outlet, a cigar jack, and the like may be provided on the center fascia 103.

The head portion 104 may be provided with an inputter 105 for receiving a user instruction, and a display 106 for displaying operation information for various functions.

The inputter 105 may receive an on instruction, off instruction, and pause instruction of various functions. The inputter 105 may include a button, a key, a switch, a pedal, a lever, a jog dial or a touch pad.

The inputter 105 may receive an instruction for selecting a driving mode such as an autonomous driving mode or a manual driving mode.

The display 106 may display operation information of various functions performed in the vehicle.

The display 106 may display a manual driving mode and an autonomous driving mode.

The display 106 may be provided as a display panel such as a liquid crystal display (LCD), a plasma display panel (PDP), and an organic light emitting diode (OLED), or may be provided as a touch screen.

The chassis of the vehicle 1 includes a power generation device, a power transmission device, a traveling device, a steering device, a braking device, a suspension device, a transmission device, a fuel device, front and rear and left and right wheels, and the like.

The vehicle 1 may further include a brake pedal for transmitting a user instruction to the braking device, and an accelerator pedal for transmitting a user instruction to the power generation device and the power transmission device.

The vehicle 1 is provided with various safety devices and convenience devices for the safety of a driver and passengers.

Examples of the convenience device include a hands-free device, a GPS, an audio device, a Bluetooth device, a rear-view camera, and the like. Also, as an example of the convenience device, there may be an autonomous driving control device.

As a convenience device, there may be a vehicle terminal 107 that performs audio, video, and navigation functions.

The vehicle terminal 107 may display menu items such as navigation, DMB (broadcast output function), radio, call, media, options, and the like, and may display an image for the function selected by a user.

Upon performing a navigation function, the vehicle terminal 107 may display at least one of map information, route information, current location information, traveling speed information, destination information, and traffic information as an image. The vehicle terminal 107 may display a traveling time, a remaining time to the destination, a current time, and the like.

The vehicle terminal 107 may include a graphical user interface (GUI) device or a physical user interface (PUI) device.

As illustrated in FIG. 1 and FIG. 2, the vehicle 1 may further include a user interface device 200 for inputting and outputting various types of information.

The user interface device 200 may transmit a user instruction corresponding to a steering manipulation of the vehicle 1. Furthermore, the user interface device 200 may transmit user instructions for the operations of the audio, air conditioner, vehicle terminal, and the like of the vehicle 1.

That is, the user interface device 200 may transmit a user instruction for controlling at least one electronic device 2.

The user interface device 200 may be provided in an active area and a view area of a driver's hand.

The user interface device 200 may include a camera 210 for obtaining a user instruction, a haptic portion 220 for outputting a feedback signal for the obtained user instruction, and an image outputter 230 for outputting operation information for the obtained user instruction.

The camera 210 may be provided in an active area of the user's hand and may be provided adjacent to the haptic portion 220.

The camera 210 may be provided at the end portion of an arm rest 108 or may be provided on the center fascia 103 and adjacent to a transmission lever.

The user may input a user instruction for manipulation of the steering wheel by making a gesture using a hand H with the arm placed on the arm rest 108. In the instant case, the camera 210 may obtain an image of the user's hand.

The camera 210 may include a CCD or CMOS image sensor. The camera 210 may be implemented as an infrared camera.

The camera 210 is a device which is configured to detect object information and converts the detected object information into an electrical image signal, and transmits an image signal for the obtained image information to a controller 205.

Hereinafter, a process for recognizing a user's gesture through the present user interface device will be described.

Figure 3:
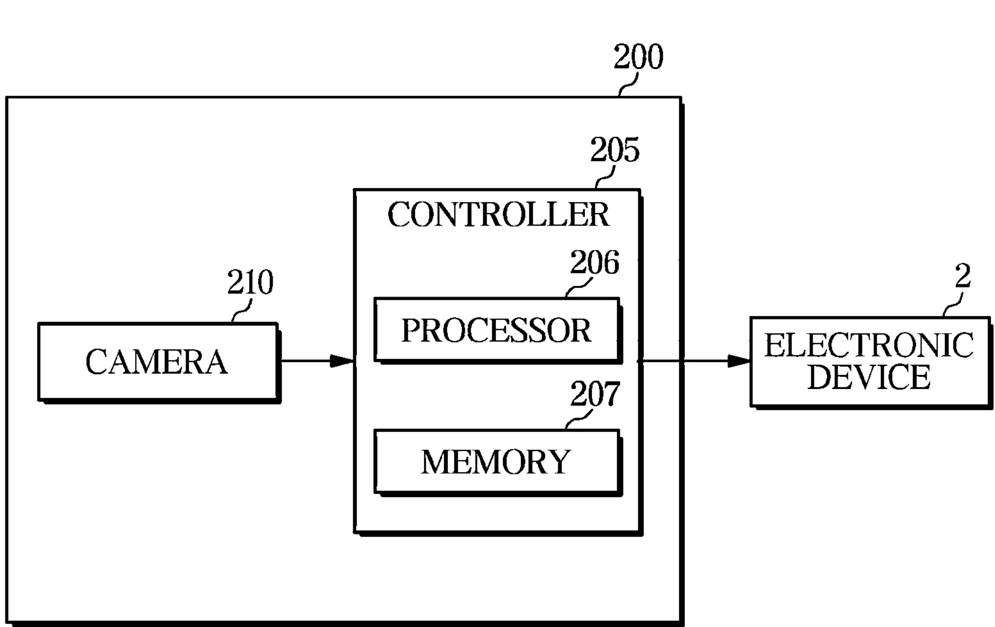
FIG. 3 illustrates a control block diagram of a user interface device and a vehicle including the same according to an exemplary embodiment of the present disclosure.
Figure 4:
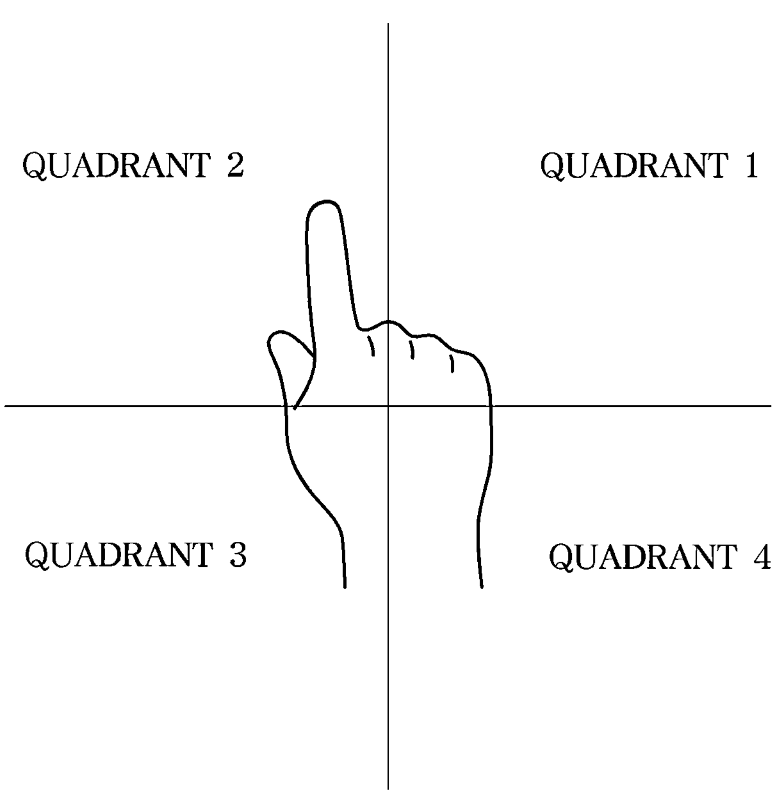
FIG. 4 is a diagram illustrating an image divided into a plurality of regions according to an exemplary embodiment of the present disclosure.

FIG. 3 illustrates a control block diagram of a user interface device and a vehicle including the same according to an exemplary embodiment of the present disclosure, and FIG. 4 is a diagram illustrating an image divided into a plurality of regions according to an exemplary embodiment of the present disclosure.

The user interface device 200 may include the camera 210 and the controller 205. The controller 205 may include at least one processor 206 and a memory 207.

The camera 210 may obtain an image of the user. For example, as the user's hand is positioned in the view range of the camera 210, the camera 210 may obtain an image of the user's hand. The camera 210 may be implemented as an infrared camera 210.

The controller 205 may include a memory 207 that stores a control program and control data for processing the image obtained by the camera 210 and recognizing a gesture and a processor 206 for generating a control signal according to the control program and control data stored in the memory 207. The memory 207 and the processor 206 may be provided integrally or separately.

The memory 207 may store the program and data for processing the image obtained by the camera 210 and recognizing a gesture.

The memory 207 may include a volatile memory such as a static random access memory (S-RAM) or a dynamic random access memory (D-rap) for temporarily storing data. Furthermore, the memory 207 may include a non-volatile memory such as a read only memory (ROM), an erasable programmable read only memory (EPROM), and an electrically erasable programmable read only memory (EEPROM) for storing data for a long time period.

The at least one processor 206 may include various logic circuits and arithmetic circuits, process data according to the program provided from the memory 207, and generate a control signal according to the processing result.

The controller 205 may divide the image obtained by the camera 210 into a plurality of regions to recognize the user's gesture, and determine the area occupied by the user's hand in each of the divided images.

For example, as illustrated in FIG. 4, the controller 205 may divide the image obtained by the camera 210 into quadrants. Accordingly, the controller 205 may determine the area occupied by the user's hand in each of the quadrants.

The controller 205 may recognize the gesture based on the determined area. The image may be divided into a plurality of regions, and the gesture may be recognized according to the ratio of the area occupied by the hand in each region.

The recognition of the gesture of the user based on the area occupied by the hand in the image may include recognizing the direction of the gesture. For example, in a case that an image is divided into four quadrants, if the ratio of the area occupied by the user's hand in a specific quadrant is a predetermined value or more than the predetermined value, the direction of the corresponding quadrant may be recognized as the direction of the gesture. Referring to FIG. 4, when the ratio of the area occupied by the user's hand in the right quadrant (quadrant 1 and quadrant 4 in FIG. 4) among the divided quadrants is a predetermined value or more than the predetermined value, the controller 205 may recognize the direction of the gesture as the right.

Accordingly, upon controlling the steering of the vehicle 1 or controlling the volume of an audio, control such as directing the steering to the right or increasing the volume of an audio may be performed.

In a case that the user is the driver of the vehicle 1, the hand recognized by the camera 210 for gesture recognition may be the user's right hand. In the case of the right hand, it is more inconvenient to turn the hand in the left direction than in the case of turning the hand in the right direction due to the structure of the hand, and accordingly, the degree of rotation may be smaller in the case of turning the hand in the left direction thereof.

According to the present problem, in a case that the user turns the hand to the left, when the turning angle of the hand is small so that the ratio of the area occupied by the user's hand in the left quadrant (quadrant 2 and quadrant 3 in FIG. 4) does not meet a certain value, there may be a problem that the direction of the gesture is not recognized to the left.

To solve the present problem, the ratio of the area of the hand for recognizing the gesture upon the left turning of the user's hand may be set to be smaller than the ratio of the area of the hand for recognizing the gesture upon the right turning of the user's hand. That is, referring to FIG. 4, if the ratio of the area occupied by the hand in quadrant 1 or 4 is greater than or equal to a first value, the direction of the gesture is set to be recognized in the direction of quadrant 1 or 4, and if the ratio of the area occupied by the hand in quadrant 2 or 3 is greater than or equal to a second value which is smaller than the first value, the direction of the gesture is set to be recognized in the direction of quadrant 2 or 3.

In determining the area of a hand based on a plurality of regions in an image, if the plurality of regions is absolutely divided even though the direction of the user's hand is twisted, the recognition of the gesture may be different depending on the shape, movement pattern, etc. of the user's hand, which may cause a problem. Accordingly, it is necessary to vary a reference for dividing the plurality of regions according to the direction of the user's hand, etc., and this will be described.

FIG. 5 is a diagram illustrating that an image is divided into a plurality of regions based on a direction of a user's wrist according to an exemplary embodiment of the present disclosure.

Figure 5A:
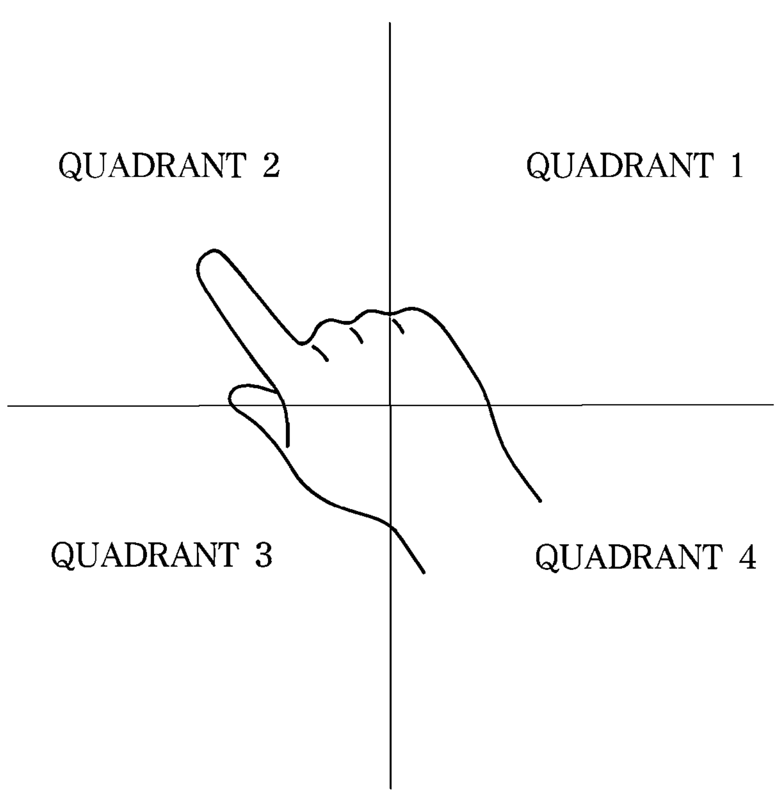
FIG. 5A and FIG. 5B are diagrams illustrating that an image is divided into a plurality of regions based on a direction of a user's wrist according to an exemplary embodiment of the present disclosure.

As illustrated in FIG. 5A, if a plurality of regions is absolutely divided even though the direction of the user's hand is misaligned, the gesture recognition may be different depending on the shape, movement pattern, etc. of the user's hand, which may cause a problem.

Accordingly, the controller 205 may determine a direction in which the user's wrist faces based on the obtained image, and divide the image obtained based on the determined direction into a plurality of regions based on the user's wrist direction.

Figure 5B:
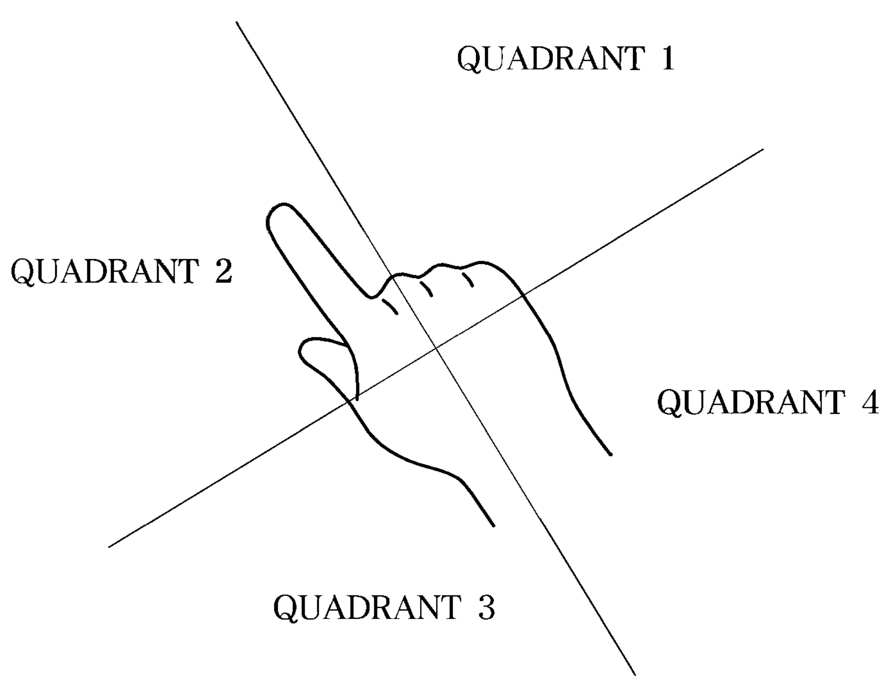

That is, as illustrated in FIG. 5B, the image may be divided into a plurality of regions based on the upper left direction, which is the direction the user's wrist faces.

In an exemplary case of dividing the image into quadrants as described above, the controller 205 divides the obtained image into quadrants based on the user's wrist direction, determines the area occupied by the hand in each quadrant, and recognizes a gesture based on this.

Accordingly, it is possible to improve the recognition rate of the gesture by reducing errors due to differences in the shape, movement pattern, etc. of the user's hand.

If the gesture recognition is always activated in performing the above-described gesture recognition, computing system resources may increase and malfunctions may occur due to unnecessary recognition. Accordingly, it is necessary to switch the state of the gesture recognition from an inactive state into an active state according to the area of the user's hand, which will be described below.

Figure 6:
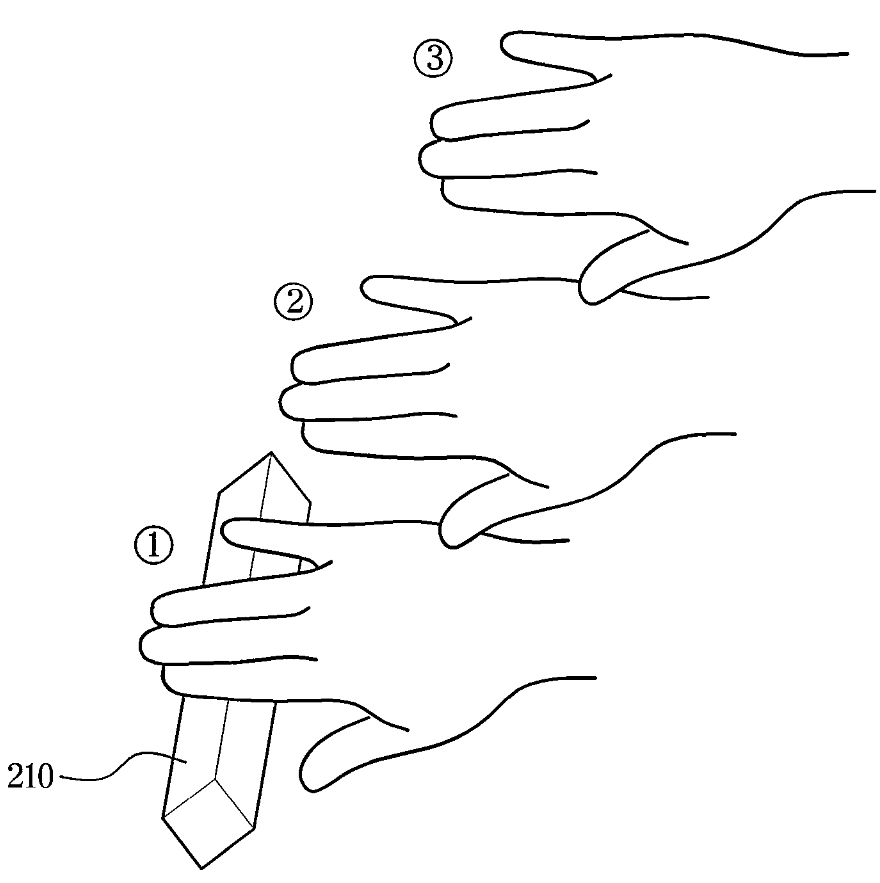
FIG. 6 is a diagram illustrating activation of a user interface device according to an exemplary embodiment of the present disclosure.
Figure 7:
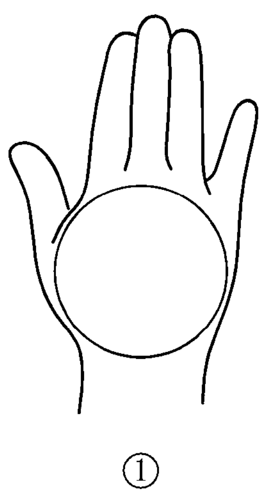
FIG. 7 is a diagram illustrating a change in the area of a user's hand occupied in an image according to an exemplary embodiment of the present disclosure.
Figure 7:
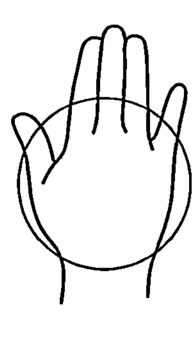
Figure 7:
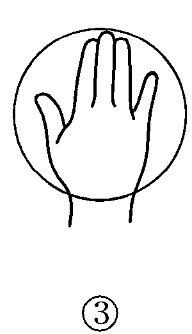

FIG. 6 is a diagram illustrating activation of a user interface device according to an exemplary embodiment of the present disclosure, and FIG. 7 is a diagram illustrating a change in an area of a user's hand occupied in an image according to an exemplary embodiment of the present disclosure.

To solve the problem caused by the constant activation of the above-described gesture recognition, the gesture recognition may be activated upon the satisfaction of a specific condition.

Referring to FIG. 6, as the user's hand moves away from the camera 210 over time, the state of the gesture recognition may be switched into an activated state.

To the present end, the controller 205 may determine a change amount in the area of the user's hand based on the obtained image, and may switch the state of the gesture recognition from an inactive state into an active state based on the determined change amount.

For example, as illustrated in FIG. 7, as the user's hand moves away, the area occupied by the user's hand in the image obtained by the camera 210 may decrease.

Accordingly, if a change amount in the area occupied by the user's hand is greater than or equal to a certain amount, that is, as the user's hand moves away from the camera 210 by a certain distance or more, the state of the gesture recognition may be switched to an active state.

According to the present process, unnecessary gesture recognition may be prevented, saving computational resources.

After the gesture recognition is activated according to a change amount in the area of the user's hand, if the state of the gesture recognition is not switched back to the inactive state, the above-described problem may occur again. Thus, if the movement of the user's hand is not recognized in the image obtained through the camera 210 for a predetermined time period, the state of the gesture recognition may be switched to an inactive state.

That is, in response to a determination that there is no movement of the user recognized through the camera 210 for more than a first time period, the controller 205 may switch the state of the gesture recognition from the active state into the inactive state.

In determining whether to activate the gesture recognition, there may be a problem in that the user wants to activate the gesture recognition but the gesture recognition is not activated, or the gesture recognition is activated even though the user does not intend to activate the gesture recognition. Hereinafter, these cases will be described.

There may be a situation in which the user takes a gesture of raising his hand while placing the hand on the camera 210 to activate the gesture recognition, but a degree of raising the hand is small, and a change amount in the area of the hand in the image is smaller than a preset first set value.

If such a case occurs again according to the user's hand habit, the controller 205 may perform calibration on the change amount in the area of the hand required to activate the gesture recognition.

That is, if the change amount in the area of the user's hand determined based on the obtained image is less than the first set value and the change amount in the area of the hand less than the first set value is recognized again within a second time period, the controller 205 may reset the change amount in the area of the hand required to activate the gesture recognition.

That is, the controller 205 may reset the change amount in the area of the hand required for activating the gesture recognition to a second set value smaller than the existing first set value. Accordingly, the gesture recognition may be activated even if the user does not raise his hand from the camera 210 with a predetermined distance.

Conversely, there may be a case in which the gesture recognition is activated by the user's hand movement even though the user does not intend to activate the gesture recognition.

For example, the gesture recognition may be unintentionally activated in situations, for example, when the user reaches out to a passenger seat while placing his or her hand near to the arm rest 108.

In the instant case, to prevent unnecessary gesture recognition from being activated, if the change amount in the area of the user's hand determined based on the obtained image is greater than or equal to the second set value greater than the first set value, the gesture recognition may be maintained in an inactive state.

That is, even if gesture recognition is not intended, as the user's hand moves rapidly, the change amount in the area of the hand may be greater than that in a normal case. In the instant case, unnecessary activation may be prevented by inactivating the gesture recognition.

Figure 8:
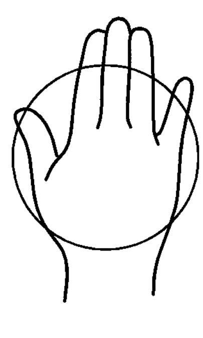
FIG. 8 is a diagram illustrating an example of gesture recognition obtained from an image according to an exemplary embodiment of the present disclosure.
Figure 8:
Figure 8:
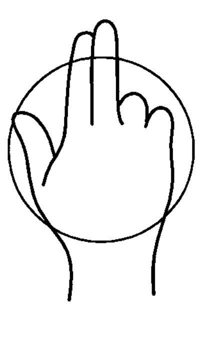
Figure 8:
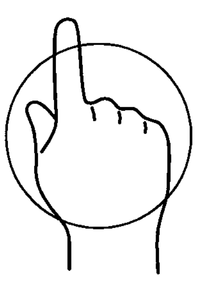

FIG. 8 is a diagram illustrating an example of gesture recognition obtained from an image according to an exemplary embodiment of the present disclosure.

As described above, if the change amount in the area of the user's hand determined based on the image obtained as the user's hand is raised is greater than or equal to a reference value, the gesture recognition may be activated.

In the instant case, the shape of the user's hand raised for the convenience of the user may be determined, and a control mode of the gesture recognition may be set differently according to the shape of the hand.

The controller 205 may generate a reference point in the image obtained by the camera 210 and generate a circle based on location information of the reference point.

The controller 205 may identify the number of fingers spanning the edge portion of the circle generated around the reference point and recognize the gesture based on the identified number of fingers.

In the instant case, if the gesture recognized as the user raises his or her hand with all fingers extending is a gesture corresponding to all five fingers spanning the edge portion of the circle, the controller may perform a control for directly entering a music playback mode.

Furthermore, when the gesture recognized as the user raises his or her hand with only three fingers extending is a gesture corresponding to three fingers spanning the edge portion of the circle, the controller may perform a control for directly entering a steering mode.

In the present way, by changing the control mode according to the shape of the user's raised hand, the user can directly enter a desired gesture recognition mode, increasing convenience in the user's manipulation.

Figure 9:
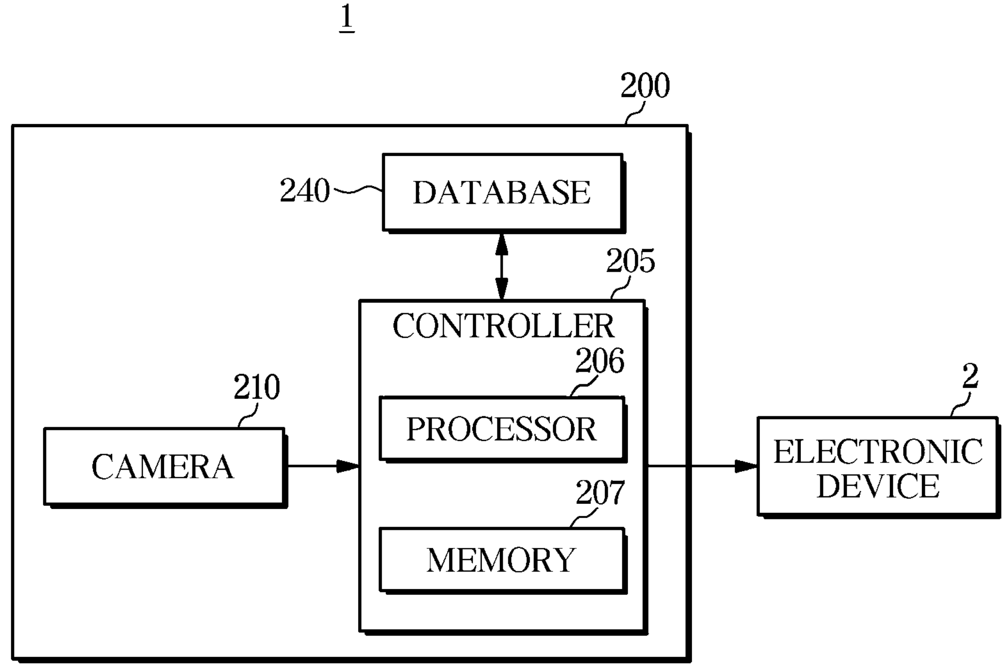
FIG. 9 illustrates a control block diagram of a user interface device and a vehicle including the same according to an exemplary embodiment of the present disclosure.

FIG. 9 is a diagram illustrating a control block diagram of a user interface device and a vehicle including the same according to an exemplary embodiment of the present disclosure.

The user interface device 200 may further include a database 240 that stores information related to the user.

The information related to the user may include information related to the shape, movement pattern, etc. of the user's hand.

The controller 205 may determine the shape and movement pattern of the user's hand based on the obtained image, and compare the determined shape and movement pattern of the user's hand with the information stored in the database 240.

If the determined shape and movement pattern of the hand matches the information stored in the database 240 as the comparison result, a gesture may be recognized based on the information stored in the database 240.

That is, by recognizing a gesture according to a predefined user's hand shape, habit, etc., even if a user is changed, the gesture recognition is performed according to a corresponding user, increasing the user's convenience and improving the recognition rate.

If the determined shape and movement pattern of the hand does not match the information stored in the database 240 as the comparison result, the controller 205 may store information related to the shape, movement pattern, etc. of a new user's hand in the database 240.

Accordingly, if the corresponding user performs the gesture recognition again later, a recognition rate may be improved by performing the gesture recognition based on the information of the corresponding user.

Figure 10:
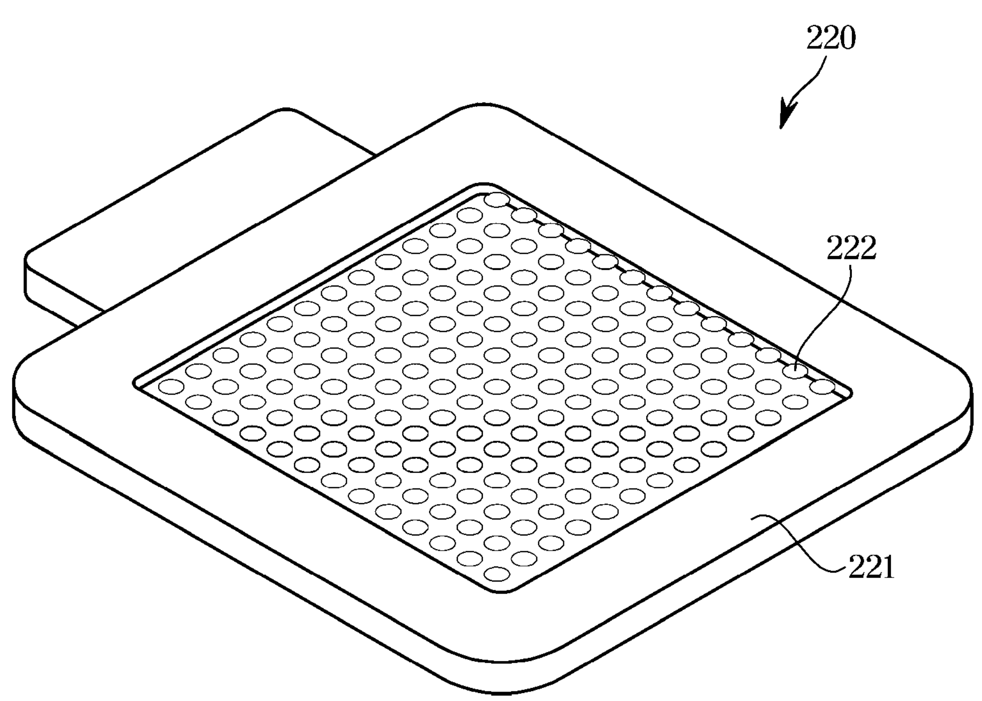
FIG. 10 is an exemplary diagram of a haptic portion of a user interface device according to an exemplary embodiment of the present disclosure.

FIG. 10 is an exemplary diagram of a haptic portion of a user interface device according to an exemplary embodiment of the present disclosure.

The user interface device 200 may further include a haptic portion 220 that outputs a tactile signal for gesture recognition in response to a control instruction of the controller 205.

The haptic portion 220 may be provided between the driver seat 101*a* and the passenger seat 101*b*.

The haptic portion 220 may be disposed within an active area of the user's hand.

The haptic portion 220 may be provided in the center fascia 103 which is the central area of the dashboard 102.

The haptic portion 220 may be provided in a form extending from one end portion of the arm rest 108.

The surface of the haptic portion 220 may be at the same height as the surface of the arm rest 108, or may be at a position lower than the surface of the arm rest 108 by a predetermined height.

The haptic portion 220 generates a tactile signal which may be felt by the user's body. The haptic portion 220 may include a vibration generator and an ultrasonic generator.

The haptic portion 220 may include a plurality of piezoelectric element arrays for outputting ultrasonic signals and an ultrasonic speaker for outputting ultrasonic sounds.

The haptic portion 220 may be provided in a small steering wheel shape, a wheel mouse shape, a shape of a sphere, or a flat shape.

As illustrated in FIG. 10, the haptic portion 220 may include a body 221 and a plurality of piezoelectric elements 222 disposed on the body and generating vibration so that the user can feel the vibration by tactile sense. Here, the plurality of piezoelectric elements 222 may generate ultrasonics and may be provided in an array form.

For example, the haptic portion 220 may include a substrate on which a plurality of pixels is disposed, a plurality of thin film transistors disposed on the substrate and disposed in each of the pixels, a planarization layer disposed on the thin film transistors and including a plurality of contact holes, a pixel electrode disposed on the planarization layer and disposed on each of the pixels, a piezoelectric material disposed on the pixel electrode, and a common electrode disposed on the piezoelectric material.

The haptic portion 220 may generate ultrasonics by vibrating the piezoelectric elements by a voltage applied to the pixel electrode and common electrode disposed on the thin film transistor array.

The plurality of piezoelectric element arrays generates ultrasonics with a vibration pressure corresponding to an input frequency corresponding to a control instruction of the controller 205.

The haptic portion 220 may further include the ultrasonic speaker, and the ultrasonic speaker may output ultrasonic sounds corresponding to the control instruction of the controller to perform user feedback.

According to the frequency of the ultrasonic signal generated by each piezoelectric element and the ultrasonic speaker, the user receives feedback through tactile and auditory senses through vibration and sound. The user feedback may be adjusted according to a driver's settings.

The user may receive not only a holographic image but also vibration pressure and sound as feedback on the steering operation.

Furthermore, it is possible for the user to receive a holographic image and a vibration pressure as the feedback on the steering operation.

It is also possible for the user to receive a holographic image and a sound at the same time as the feedback on the steering operation.

Figure 11:
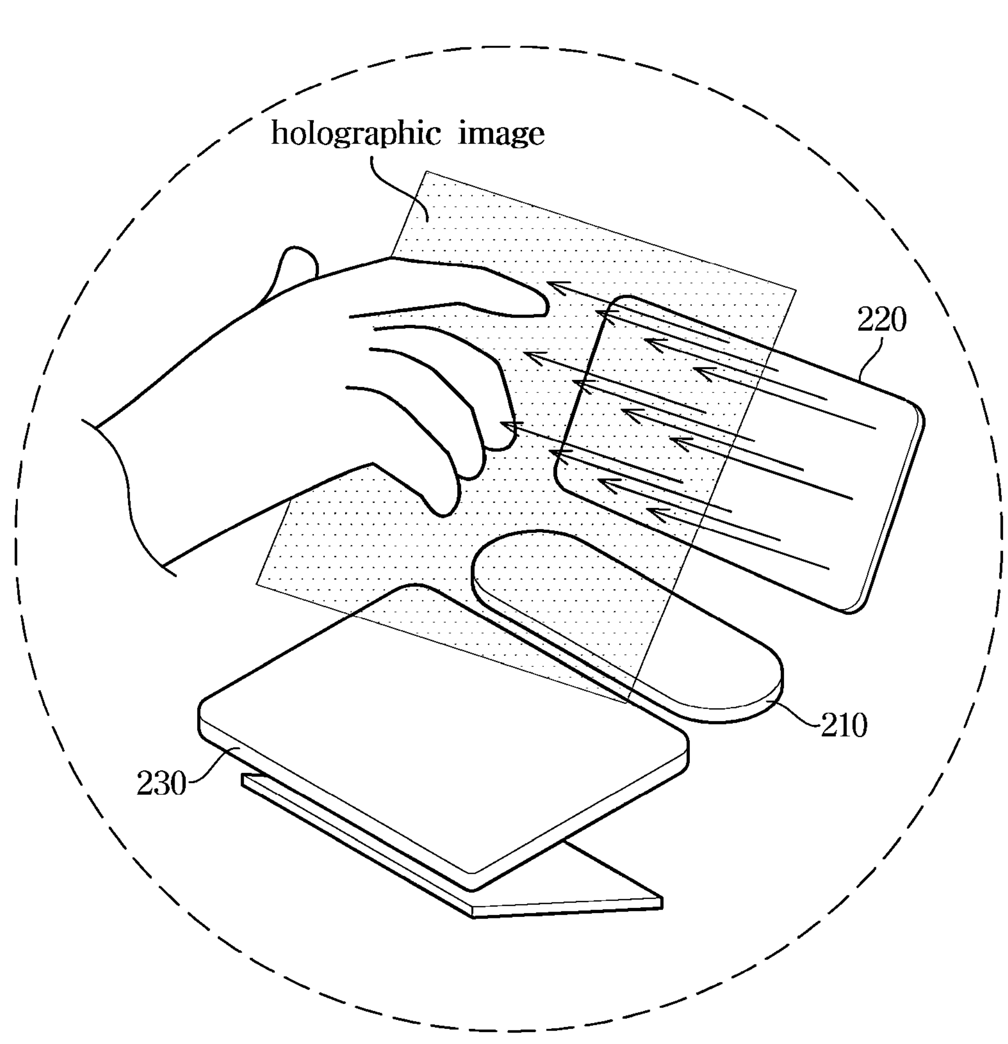
FIG. 11 is an exemplary diagram of an image outputter of a user interface device according to an exemplary embodiment of the present disclosure.

FIG. 11 is an exemplary diagram of an image outputter of a user interface device according to an exemplary embodiment of the present disclosure.

The user interface device 200 may further include an image outputter 230 that outputs a manipulation system image.

The image outputter 230 may be provided within the user's view area, or may be provided adjacent to the haptic portion 220.

The image outputter 230 may display the steering information corresponding to the user instruction obtained from the camera 210.

The image outputter 230 may display an image corresponding to the operation of the steering wheel corresponding to the steering information.

As illustrated in FIG. 2, the image outputter 230 may include a holographic image outputter that displays an image corresponding to the operation of the steering wheel as a holographic image.

In a case that the image outputter 230 is a holographic image outputter, the user interface device 200 may be provided as illustrated in FIG. 10.

The image outputter 230 may be provided on one side of the camera 210.

The haptic portion 220 may be provided at a position adjacent to the image outputter 230 so that the ultrasonics can reach the position of the holographic image formed by the image outputter 230.

The position information of the haptic portion 220 may be determined based on the image formation position information of the image outputter 230.

In a case that the use of the user interface device 200 is unnecessary, for example, in the case of performing an autonomous driving mode, the user interface device may be turned off. In the instant case, a vehicle may provide a sense of integrity between the user interface device 200 and the arm rest 108.

The controller may set an output position of a tactile signal output through the haptic portion based on the position information at which the hologram image is displayed.

Figure 12:
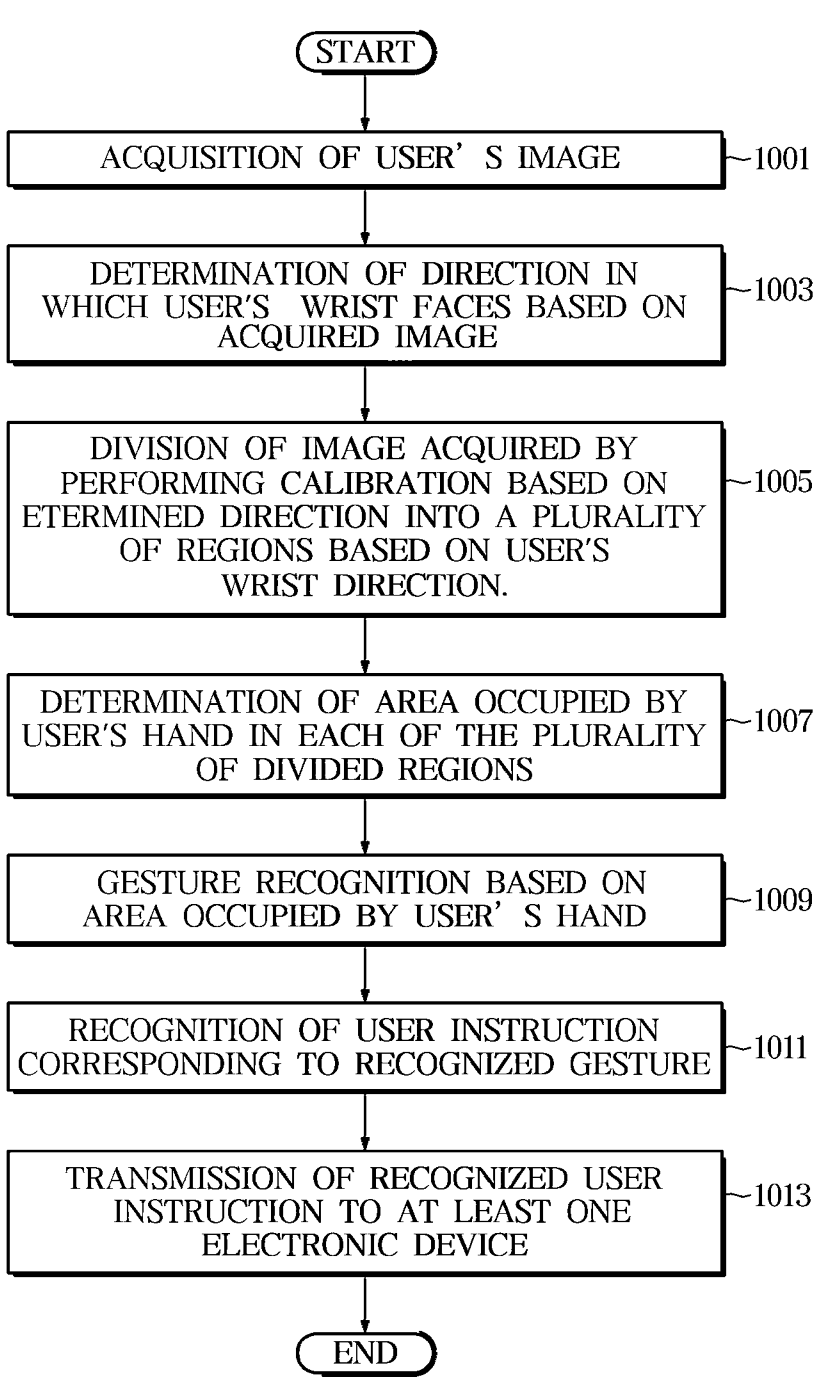
FIG. 12 is a flowchart illustrating a method of controlling a vehicle according to an exemplary embodiment of the present disclosure.

FIG. 12 is a flowchart illustrating a method of controlling a vehicle according to an exemplary embodiment of the present disclosure.

The camera 210 may obtain an image of the user (1001). Accordingly, as the user's hand is positioned in the view range of the camera 210, the camera 210 may obtain an image of the user's hand. The camera 210 may be implemented as an infrared camera 210.

The controller 205 may divide the image obtained by the camera 210 into a plurality of regions, and determine the area occupied by the user's hand in each of the divided images.

In determining the area of the hand based on the plurality of regions in the image, if the plurality of regions is absolutely divided, the recognition of the gesture may be different depending on the shape, movement pattern, etc. of the user's hand, which may cause a problem.

Accordingly, the controller 205 may determine a direction in which the user's wrist faces based on the obtained image (1003), and divide the obtained image into a plurality of regions based on the user's wrist direction (1005).

For example, as illustrated in FIG. 4, the image may be divided into a plurality of regions based on the upper left direction, which is the direction the user's wrist faces.

The controller 205 may determine the area occupied by the user's hand in each of the divided regions (1007).

For example, the controller 205 may divide the image obtained by the camera 210 into quadrants, and determine the area occupied by the user's hand in each of the quadrants.

Thereafter, a gesture may be recognized based on the determined area (1009), a user instruction corresponding to the recognized gesture may be recognized (1011), and the recognized user instruction may be transmitted to at least one electronic device (1013).

If the gesture recognition is always activated in performing the above-described gesture recognition, computing system resources may increase and malfunctions may occur due to unnecessary recognition. Accordingly, it is necessary to switch a state of gesture recognition from an inactive state into an active state according to the area of the user's hand, which will be described below.

Figure 13:
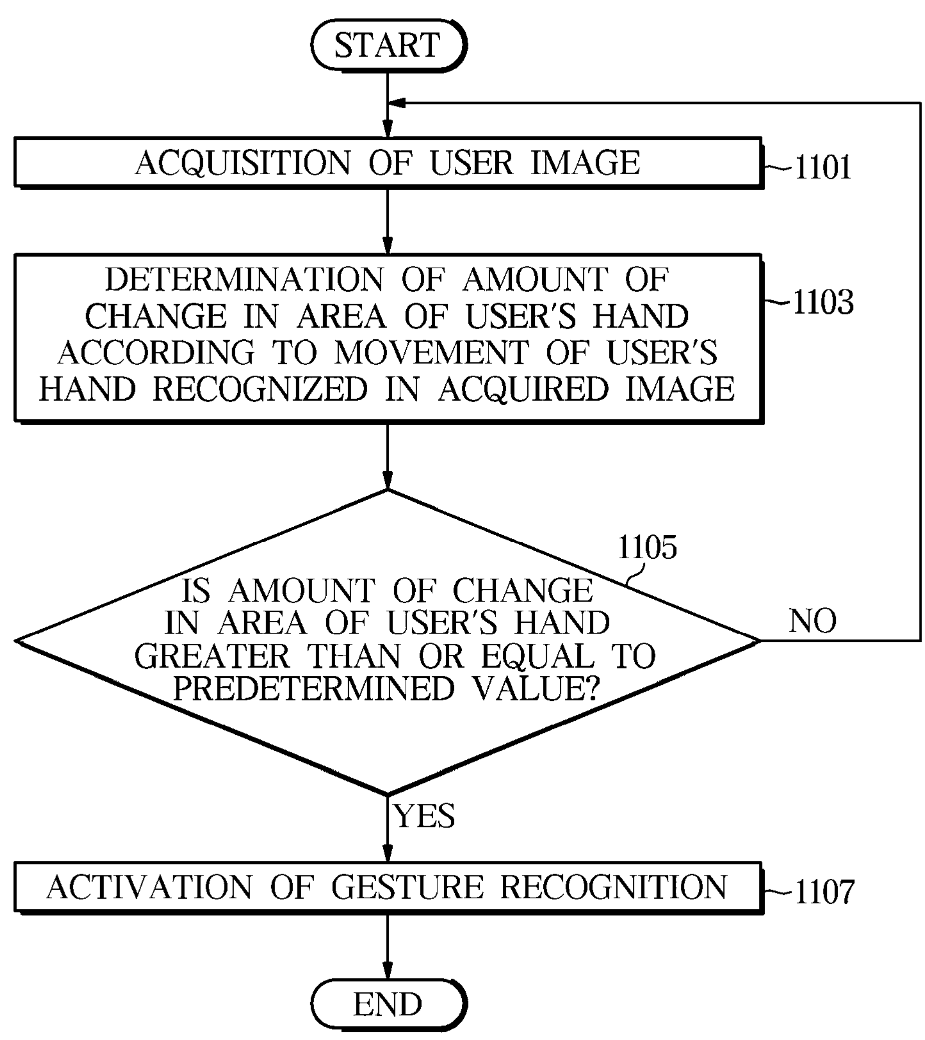
FIG. 13 is a flowchart illustrating a method of controlling a vehicle according to an exemplary embodiment of the present disclosure.

FIG. 13 is a flowchart illustrating a method of controlling a vehicle according to an exemplary embodiment of the present disclosure.

To solve the problem caused by the constant activation of the above-described gesture recognition, upon the satisfaction of a specific condition, the gesture recognition may be activated.

To the present end, the image of the user is obtained (1101), the controller 205 determines a change amount in the area of the user's hand based on the obtained image (1103), and may switch the state of the gesture recognition from an inactive state into an active state based on the determined change amount.

For example, as illustrated in FIG. 6, as the user's hand moves away, the area occupied by the user's hand in the image obtained by the camera 210 may decrease.

Accordingly, if the change amount in the area occupied by the user's hand is greater than or equal to a certain amount (Yes in 1105), that is, as the user's hand moves away from the camera 210 by a certain distance or more, the state of the gesture recognition may be switched to the activated state (1107).

According to the user interface device included herein, a vehicle including the user interface device, and a method of controlling the vehicle, in obtaining the user's image and recognizing the gesture, the reference area for determining the area occupied by the hand in the image is varied according to the angle of the user's hand, etc., and the recognition rate of gestures may be increased.

Furthermore, by adding a gesture for activating gesture recognition, the user's convenience may be increased, the resource of the computing system may be reduced, and misrecognition may be reduced.

According to a user interface device, a vehicle including the user interface device, and a method of controlling the vehicle according to an aspect, in recognizing a gesture by obtaining an image of a user, a reference area for determining an area occupied by a hand in an image is varied according to the angle of the user's hand, etc., and the recognition rate of gesture may be improved.

Furthermore, by adding a gesture for activating gesture recognition, the user's convenience may be increased, the resource of the computing system may be reduced, and misrecognition may be reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A user interface apparatus which receives a user instruction for controlling at least one electronic device, the user interface apparatus comprising:

a camera configured to obtain an image of a user; and at least one processor configured to divide the obtained image into a plurality of regions, to determine an area occupied by the user's hand in each of the divided regions, and to recognize gesture of the user based on the area occupied by the user's hand, wherein the at least one processor is configured to determine a direction in which the user's wrist faces based on the obtained image, and to divide the obtained image into the plurality of regions based on the direction of the user's wrist, wherein the at least one processor is configured to set a second value for a ratio of the area occupied by the user's hand required to recognize a direction of the gesture in a second region among the plurality of regions to be smaller than a first value for a ratio of the area occupied by the user's hand required to recognize the direction of the gesture in a first region among the plurality of regions.

2. The user interface apparatus of claim 1, wherein the at least one processor is further configured to divide the obtained image into quadrants based on the direction of the user's wrist to determine the area occupied by the user's hand in each of the quadrants.

3. The user interface apparatus of claim 1, wherein the at least one processor is further configured to determine a change amount in the area of the user's hand based on the obtained image, and to switch a state of gesture recognition from an inactive state into an active state based on the determined change amount.

4. The user interface apparatus of claim 3, wherein the at least one processor is further configured to switch the state of the gesture recognition into the active state when the change amount in the area of the user's hand determined based on the obtained image is greater than or equal to a first set value.

5. The user interface apparatus of claim 3, wherein the at least one processor is further configured to switch the state of the gesture recognition from the active state into the inactive state upon concluding that there is no movement of the user recognized through the camera for more than a first time period.

6. The user interface apparatus of claim 4, wherein the at least one processor is further configured to reset the change amount in the area of the user's hand required for activating the gesture recognition when the change amount in the area of the user's hand determined based on the obtained image is less than the first set value, and the change amount in the area of the user's hand less than the first set value is recognized again within a second time period.

7. The user interface apparatus of claim 4, wherein the at least one processor is further configured to maintain the gesture recognition in the inactive state when the change amount in the area of the user's hand determined based on the obtained image is greater than or equal to a second set value which is greater than the first set value.

8. The user interface apparatus of claim 1, further including a database configured to store information related to the user, wherein the at least one processor is further configured to determine a shape and movement pattern of the user's hand based on the obtained image and compare the determined shape and movement pattern of the user's hand with the information stored in the database, and recognize the gesture based on the information stored in the database when the determined shape and movement pattern of the user's hand matches the information stored in the database.

9. A vehicle comprising:

a camera configured to obtain an image of a user; and at least one processor configured to divide the obtained image into a plurality of regions, to determine an area occupied by the user's hand in each of the divided regions, and to recognize gesture of the user based on the area occupied by the user's hand, wherein the at least one processor is further configured to determine a direction in which the user's wrist faces based on the obtained image, and to divide the obtained image into the plurality of regions based on the direction of the user's wrist, and wherein the at least one processor is configured to set a second value for a ratio of the area occupied by the user's hand required to recognize a direction of the gesture in a second region among the plurality of regions to be smaller than a first value for a ratio of the area occupied by the user's hand required to recognize the direction of the gesture in a first region among the plurality of regions.

10. The vehicle of claim 9, wherein the at least one processor is further configured to divide the obtained image into quadrants based on the direction of the user's wrist to determine the area occupied by the user's hand in each of the quadrants.

11. The vehicle of claim 9, wherein the at least one processor is further configured to determine a change amount in the area of the user's hand based on the obtained image, and to switch a state of gesture recognition from an inactive state into an active state based on the determined change amount.

12. The vehicle of claim 11, wherein the at least one processor is further configured to switch the state of the gesture recognition into the active state when the change amount in the area of the user's hand determined based on the obtained image is greater than or equal to a first set value.

13. The vehicle of claim 11, wherein the at least one processor is further configured to switch the state of the gesture recognition from the active state into the inactive state upon concluding that there is no movement of the user recognized through the camera for more than a first time period.

14. The vehicle of claim 12, wherein the at least one processor is further configured to reset the change amount in the area of the user's hand required for activating the gesture recognition when the change amount in the area of the user's hand determined based on the obtained image is less than the first set value, and the change amount in the area of the user's hand less than the first set value is recognized again within a second time period.

15. The vehicle of claim 12, wherein the at least one processor is configured to maintain the gesture recognition in the inactive state when the change amount in the area of the user's hand determined based on the obtained image is greater than or equal to a second set value which is greater than the first set value.

16. The vehicle of claim 9, further including a database configured to store information related to the user, wherein the at least one processor is further configured to determine a shape and movement pattern of the user's hand based on the obtained image and to compare the determined shape and movement pattern of the user's hand with the information stored in the database, and to recognize the gesture based on the information stored in the database when the determined shape and movement pattern of the user's hand matches the information stored in the database.

17. A method of controlling a vehicle, the method comprising:

obtaining an image of a user through a camera;

determining, by at least one processor, a direction in which the user's wrist faces based on the obtained image;

adaptively dividing, by the at least one processor, the obtained image into a plurality of regions based on the direction of the user's wrist;

determining, by the at least one processor, an area occupied by the user's hand in each of the divided regions; and recognizing, by the at least one processor, gesture of the user based on the area occupied by the user's hand, wherein the dividing the obtained image into a plurality of regions comprises setting a second value for a ratio of the area occupied by the user's hand required to recognize a direction of the gesture in a second region among the plurality of regions to be smaller than a first value for a ratio of the area occupied by the user's hand required to recognize the direction of the gesture in a first region among the plurality of regions.

18. The method of claim 17, further including:

determining, by the at least one processor, a change amount in the area of the user's hand based on the obtained image; and switching, by the at least one processor, a state of gesture recognition from an inactive state into an active state based on the determined change amount in the area of the user's hand.

19. The method of claim 18, further including switching, by the at least one processor, the state of the gesture recognition from the active state into the inactive state upon concluding that there is no movement of the user recognized through the camera for more than a first time period.

20. The method of claim 17, wherein the recognizing the gesture includes:

determining a shape and movement pattern of the user's hand based on the obtained image;

comparing the determined shape and movement pattern of the user's hand with user information stored in a database; and recognizing the gesture based on the information stored in the database when the determined shape and movement pattern of the user's hand matches the information stored in the database.

* * * * *